(12) United States Patent
Harrison

(10) Patent No.: US 7,052,127 B2
(45) Date of Patent: May 30, 2006

(54) ONE-PIECE INTEGRALLY-FORMED GOGGLE

(75) Inventor: Donald G. Harrison, Houston, TX (US)

(73) Assignee: Warnaco Swimwear Products Inc., Los Angeles, CA (US)

( * ) Notice: Subject to any disclaimer, the term of this patent is extended or adjusted under 35 U.S.C. 154(b) by 34 days.

(21) Appl. No.: 10/055,304

(22) Filed: Jan. 23, 2002

(65) Prior Publication Data

US 2004/0218286 A1 Nov. 4, 2004

(Under 37 CFR 1.47)

(51) Int. Cl.
*G02C 13/00* (2006.01)
*A61F 9/02* (2006.01)

(52) U.S. Cl. ............................ 351/41; 351/178; 2/426
(58) Field of Classification Search .................. 351/41, 351/159, 178; 2/426, 431–434, 454
See application file for complete search history.

(56) References Cited

U.S. PATENT DOCUMENTS

| | | | |
|---|---|---|---|
| 2,975,426 A | 3/1961 | Rabb | |
| 4,556,995 A | 12/1985 | Yamamoto | |
| 4,610,036 A | 9/1986 | LaPrairie | |
| 4,620,957 A | 11/1986 | Horton, Jr. | |
| 4,868,930 A | 9/1989 | Blackstone | |
| 5,275,764 A | 1/1994 | Hettinga | |
| 5,406,340 A * | 4/1995 | Hoff | ........................... 351/156 |
| 5,408,702 A | 4/1995 | Chiang | |
| 5,413,743 A | 5/1995 | Prophet | |
| 5,494,615 A | 2/1996 | Wang Lee | |
| 5,524,300 A | 6/1996 | Chiang | |
| 5,603,125 A | 2/1997 | Chou | |
| 5,687,428 A | 11/1997 | Yamamoto | |
| 5,802,621 A | 9/1998 | Chou | |
| 5,829,064 A | 11/1998 | Huang | |
| 5,882,553 A | 3/1999 | Prophet et al. | |
| 6,070,272 A | 6/2000 | Chiang | |
| 6,079,054 A | 6/2000 | Chou | |
| 6,092,243 A | 7/2000 | Wu et al. | |
| 6,098,205 A * | 8/2000 | Schwartz et al. | .............. 2/428 |
| 6,105,177 A | 8/2000 | Paulson et al. | |

* cited by examiner

*Primary Examiner*—Huy Mai
(74) *Attorney, Agent, or Firm*—Katten Muchin Rosenman LLP

(57) ABSTRACT

A one-piece integrally-formed goggle includes as components thereof two lenses, two frame members (each frame member mounting a respective one of said lenses and having a proximal end and a distal end), a bridge connecting the proximal ends of the frame members, and a strap connecting the distal ends of the frame members. The components are flexible, and the goggle is integrally formed in a molding operation.

25 Claims, 3 Drawing Sheets

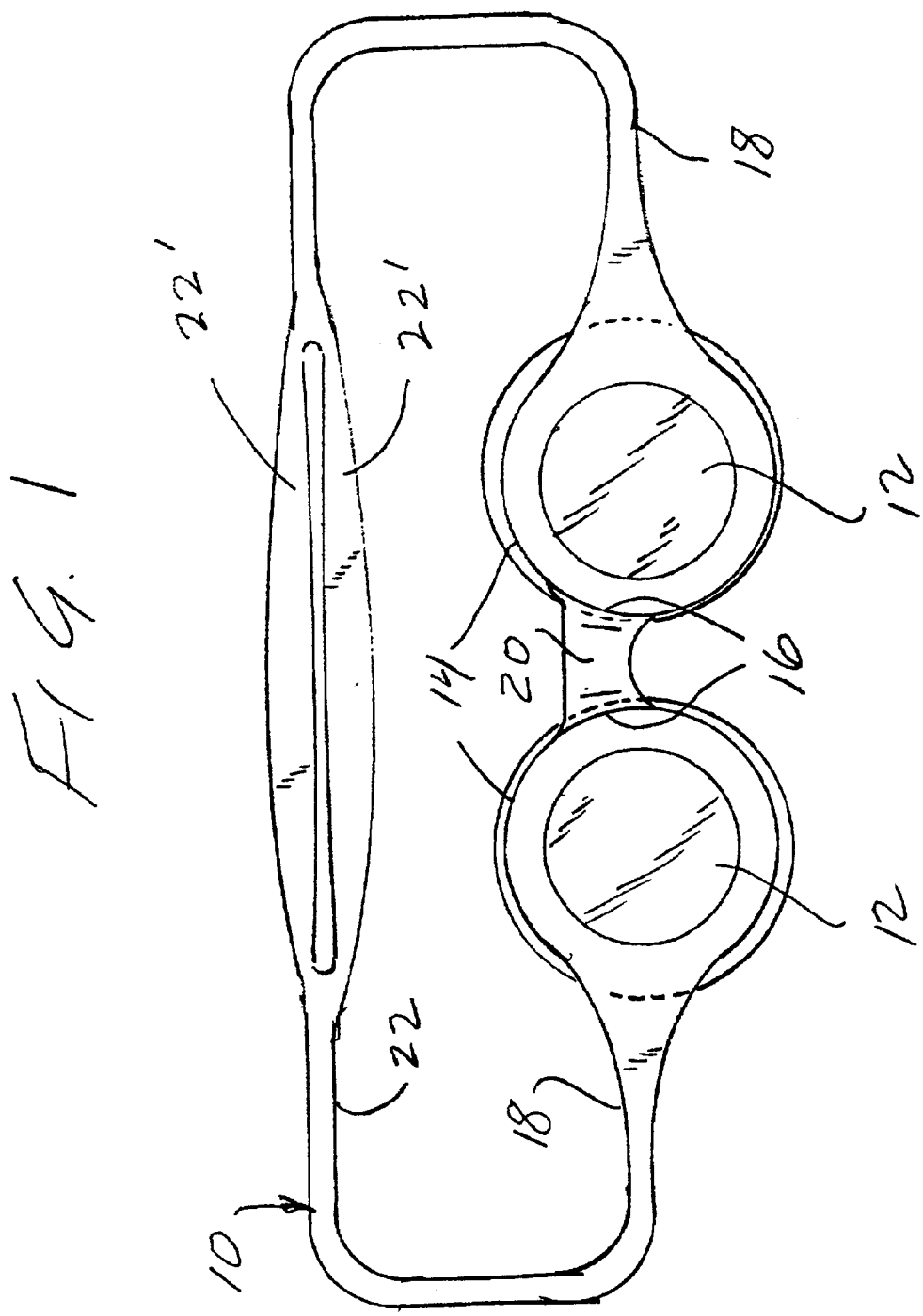

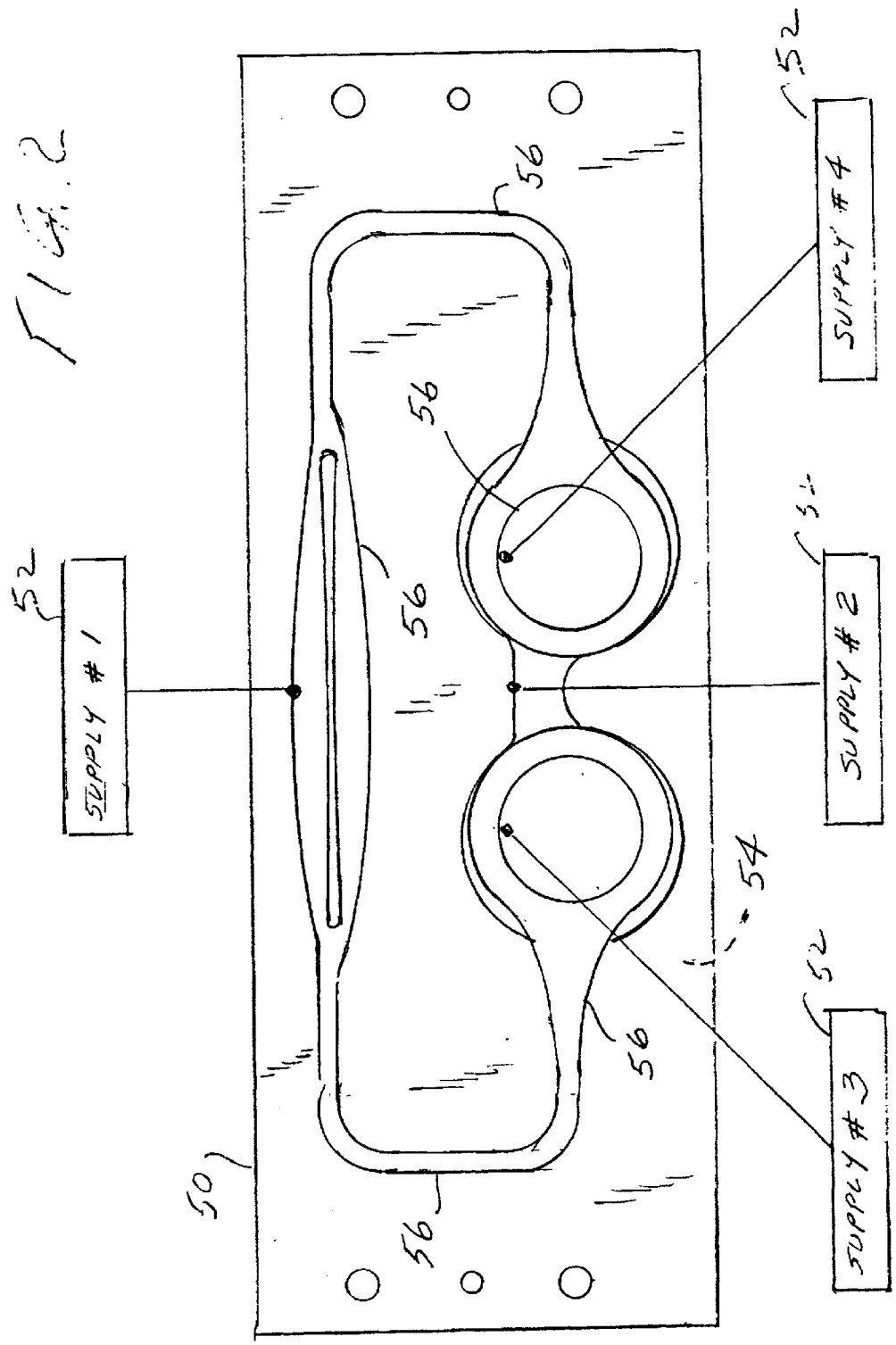

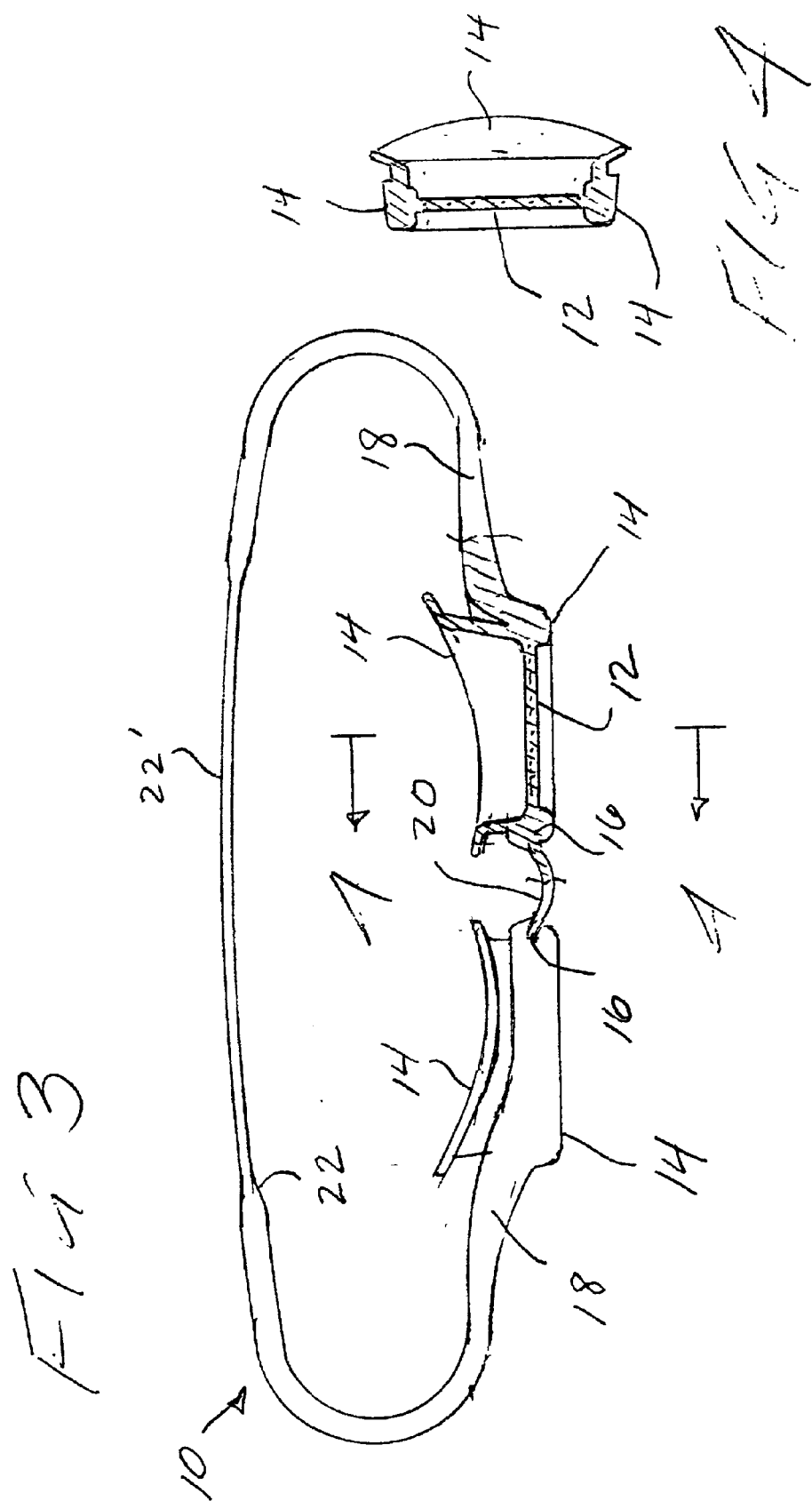

ONE-PIECE INTEGRALLY-FORMED GOGGLE

BACKGROUND OF THE INVENTION

The present invention relates to a goggle, such as a swim goggle, and more particularly to such a goggle wherein each of the components is flexible and the goggle is integrally formed in a molding operation.

It is well known in the goggle art to form a goggle from the following components: two lenses, two frame members, a bridge and a strap. The lenses are usually rigid and transparent, although, if desired, they may also be tinted. Each of the frame or padding members mounts a respective one of the lenses. Typically the frame member is resilient and adapted to receive and maintain a snap-fit, substantially rigid lens therein against accidental displacement therefrom. In the case of a swim goggle or other desirably liquid-tight goggle, the mounting of the lens within the frame member is preferably watertight. The frame member in such an instance makes a watertight connection so that the lenses, the frame members and the wearer's face define about each of the wearer's eyes a watertight and water-free compartment. Each frame member has a proximal end and a distal end. The bridge connects the proximal ends of the frame members, typically extending over the nose of the wearer, while a strap or headband connects the distal ends of the frame members, typically extending over the back and sides of the wearer's head.

The prior art frames have not proven to be entirely satisfactory from the point of view of either the manufacturer or the user.

From the point of view of the manufacturer, the production and assembly process is difficult and costly. Six separate elements must first be produced (that is, two lenses, two frame members, a bridge and a strap) and then assembled together to produce a saleable goggle. Not only must each lens be inserted into its respective frame member, as noted above, but each frame member must have two additional connections, one to the bridge and one to the strap. Such an assembly process is complex and labor-intensive.

From the point of view of the user, the prior art goggle is likely to at least partially come apart during prolonged use—for example, the lenses may separate from the frame members, the bridge may separate from one of the frame members, or the strap may separate from one of the frame members. Further, the ability of the user to transport the goggle in a compact folded orientation is limited by the possibility of either or both of the rigid lenses being broken during folding or transporting. Finally, because the lenses are not breathable and there is typically a temperature difference between the outside water and the air in the watertight chamber formed by the lens, the face and the frame member, there is frequently fogging of the lens during use.

Accordingly, it is an object of the present invention to provide a one-piece integrally-formed goggle.

Another object is to provide such goggle having the components thereof flexible.

Yet another object is to provide such a goggle which is integrally formed in a molding operation.

A further object is to provide such a goggle wherein the lenses promote temperature equalization between both major surfaces thereof.

It is also an object of the present invention to provide such a goggle which is relatively light in weight.

It is a further object to provide such a goggle which is simple and inexpensive to manufacture, use and maintain.

SUMMARY OF THE INVENTION

It has now been found that the above and related objects of the present invention are obtained in a one-piece integrally-formed goggle comprising the following components: two lenses, two frame members, a bridge and a strap. Each frame member mounts a respective one of the lenses and has a proximal end and a distal end. The bridge connects the proximal ends of the frame members, and the strap connects the distal ends of the frame members. The components are flexible, and the goggle is integrally formed in a molding operation.

In a preferred embodiment, the lenses have a durometer hardness higher than the frame members, and the frame members have a durometer hardness higher than the strap. The lenses are formed of a transparent colorless material, while the other components are formed of a material colored relative to the transparent colorless material. Preferably at least some of the colored components are substantially transparent.

In a preferred embodiment, the frame members are formed of a material including microballoons for low density (and thus low weight) frame members and the lenses are formed of a breathable material to promote temperature equalization between both major surfaces of each lens.

Where the goggle is a swim goggle, the lenses and the frame members are watertight, and the strap and bridge ensure a watertight connection between the frame members and the wearer's face.

BRIEF DESCRIPTION OF THE DRAWING

The above and related objects, features and advantages of the present invention will be more fully understood by reference to the following detailed description of the presently preferred, albeit illustrative, embodiments of the present invention when taken in conjunction with the accompanying drawing wherein:

FIG. 1 is a front elevational view of a goggle according to the present invention;

FIG. 2 is a fragmentary schematic view of a mold for the manufacture of the goggle;

FIG. 3 is a top plan view of the goggle, with a portion thereof removed to reveal details of internal construction; and FIG. 4 is a sectional view taken along the line 4—4 of FIG. 3.

DETAILED DESCRIPTION OF THE PREFERRED EMBODIMENTS

Referring now to the drawing, and in particular to FIGS. 1 and 3–4 thereof, therein illustrated is a one-piece integrally-formed goggle according to the present invention, generally designated by the reference numeral 10. Although the goggle 10 is one-piece and integrally-formed, it is comprised of the following components: two lenses 12, two frame members 14 (each frame member 14 having a proximal end 16 and a distal end 18), a bridge 20 connecting the proximal ends 16 of the frame members 14, and a strap 22 connecting the distal ends 18 of the frame members 14.

Each of the components is preferably formed substantially of silicone or a like elastomeric material which is flexible and may be transparent in a given formulation. Because the lenses 12 are not rigid, they are less likely to break than a conventional goggle lens during folding of a goggle for storage or transport.

The lenses 12 are preferably formed of a transparent colorless material, while the other components 14, 20 and 22 are preferably formed of a material colored relative to the transparent colorless material of the lenses 12. Optionally, at least some of the colored components are substantially transparent, at least in part, so as to contrast with the colorless material of the lenses 12.

Preferably the lenses 12 have a durometer hardness higher than the frame members 14, and the frame members 14 have a durometer hardness higher than the strap 22. The durometer hardness of the bridge 20 is selected to provide appropriate comfort and stretch.

In order to reduce fogging of the lenses 12 during use of the goggle 10—e.g., under water—the lenses 12 are preferably formed from a breathable material such that air can pass from one major surface of the lens to the other major surface thereof. Thus the lenses promote temperature equalization between both major surfaces of each lens, thereby to reduce fogging of the lenses.

Each frame member 14 preferably comprises a lens-holding portion 14A and a face-sealing portion 14B. The lens-holding portion 14A is relatively distant from the wearer's face, while the face-sealing portion 14B is closely adjacent and preferably contiguous with the wearer's face during use of the goggle. The face-sealing portion 14B is preferably of a substantially lower durometer hardness than the lens-holding portion 14A since the face-sealing portion 14B must be able to adapt to the configuration and dimensions of the wearer's face (thereby to effect a watertight seal) under only the modest tension exerted by the strap 22.

Preferably the bridge 20 connects the proximal ends of the lens-holding portions 14A, and the strap connects the distal ends of the lens-holding portions 14A, as the face-sealing portions 14B are generally thinner, weaker and more easily torn.

In order to maintain the strap 22 easily stretchable (for convenient placement around the head of the wearer), a length of the strap 22 may be bifurcated so as to form two sub-straps 22' connected to each other only at the ends thereof. Typically the strap 22 is preferably wider along this length for better seating on the head of the wearer.

The present invention contemplates as a preferred embodiment a swim goggle and, for this reason, the lenses 12 and the frame members 14 are preferably watertight so as to form, with the user's face (now shown), a pair of water-free chambers.

The one-piece integrally-formed goggle 10 according to the present invention may be made by preparing a flexible material (such as silicone) and integrally forming from the flexible material a goggle comprising the following components: the two lenses 12, the two frame members 14, the bridge 20 connecting proximal ends of the frame members 14, and a strap 22 connecting distal ends of the frame members 14. Where the components are integrally formed by molding, differing feeds may be used during the molding process in order to obtain different physical properties (durometer hardness, color, and the like) for the different components, preferably as taught by the Harrison Patents: U.S. Pat. Nos. 5,914,082; 5,928,593; and 5,939,004. The aforementioned Harrison Patents are incorporated herein by reference as fully as if set forth hereinbelow. The Harrison Patents are interrelated and disclose how different portions or components of an integrally formed article may be integrally molded such that the various portions have different characteristics. This may be accomplished in a variety of different ways.

One way of achieving the desired goal is to provide each of the several portions or components of the article with a separate feed channel, a different moldable material being fed through each feed channel so as to form the several portions of the article during an integral molding operation. Thus, while all of the portions of the molded article may be formed of silicone, different types and grades of silicone or silicone blends may be used so that the several portions vary in characteristics after molding. Preferably, the different materials are chemically different, although they may be chemically smaller and differ primarily in physical characteristics.

Another way of achieving the desired goal is to feed the same material into each portion of a special mold which is adapted to provide different degrees of curing for different portions of the article being molded. Thus, the mold may have chilled sections and heated sections which result, respectively, in less cured and more cured portions of the article such that the resultant molded article has portions exhibiting different characteristics (as a reflection of the different degrees of cure).

Yet another way of achieving the same goal is to specially design the configuration and dimensions of the several portions of the molded article such that, although the several portions of the article may be made from the same material and cured to the same degree, the several portions will exhibit different characteristics (e.g., flexibility, resilience, hardness, extensibility, and the like). The selection of appropriate configurations and dimensions to achieve this goal will be obvious to those skilled in the art.

Each of the aforementioned techniques or other like techniques for providing an integrally molded article with portions displaying different characteristics may be used separately or in combination with one another in order to achieve the desired goal. Thus, different materials may be individually fed into different portions of the mold, the different portions of the mold may be configured and dimensioned to provide molded portions displaying different characteristics, and the mold may provide different levels of cure for different portions of the molded article.

Referring now to FIG. 2, therein illustrated is a mold 50 for use in the manufacture of the goggle 10 of the present invention. The mold 50 may incorporate one or more of the features described in the Harrison Patents and is illustrated as including individual feeds 52 for different portions of the article to be molded, different heating and cooling mechanisms 54 for different portions of the article to be molded, and mold cavities 56 configured and dimensioned to provide different portions of the molded article with different characteristics, although any given mold 50 may incorporate only one or more of these features.

The goggle of the present invention eliminates the need for the production of six separate components (as for a prior art goggle) and eliminates the need for assembly of such six separate components into a goggle. It also provides a better goggle because the components thereof cannot accidently separate or disassemble since they are integrally-formed together. Accordingly, the goggle is superior from the point of view of the manufacture (due to elimination of the multi-component production and assembly process) and to the user (because of the reduced opportunity for component separation). Further, in a particular embodiment the goggle may have lighter frame members and breathable lenses which reduce fogging.

To summarize, the present invention provides a one-piece integrally-formed goggle, the goggle having flexible components and being integrally-formed in a molding operation. The goggle promotes temperature equalization between both major surfaces of the lenses and is lightweight due to incorporation of microballoons into the frame members. The goggle is simple and inexpensive to manufacture, use and maintain since the goggle is integrally-formed in a one-step molding operation, and thereby avoids the prior art need for the initial production of separate components and the subsequent assembly of such separate components into a goggle.

Now that the preferred embodiments of the present invention have been shown and described in detail, various modifications and improvements thereon will become readily apparent to those skilled in the art. Accordingly, the spirit and scope of the present invention are to be construed broadly and limited only by the appended claims, and not by the foregoing specification.

I claim:

1. One-piece integrally-formed goggle comprising the following components:
    (A) two lenses,
    (B) two frame members, each frame member mounting a respective one of said lenses and having a proximal end and a distal end,
    (C) a bridge connecting said proximal ends of said frame members, and
    (D) a strap connecting said distal ends of said frame members;
    said components being flexible, and said goggle being integrally formed in a molding operation.

2. The goggle of claim 1 wherein each of said components is formed substantially of silicone.

3. The goggle of claim 1 wherein said lenses have a durometer hardness higher than said frame members, and said frame members have a durometer hardness higher than said strap.

4. The goggle of claim 1 wherein said lenses are formed of a transparent colorless material, and the other of said components are formed of a material colored relative to said transparent colorless material.

5. The goggle of claim 4 wherein at least some of said colored components are substantially transparent.

6. The goggle of claim 1 wherein said frame members are formed of material including microballoons.

7. The goggle of claim 1 wherein said lenses are formed from a breathable material to promote temperature equalization between both major surfaces of each said lens.

8. The goggle of claim 1 wherein said lenses and said frame members are watertight.

9. The goggle of claim 1 wherein said strap is bifurcated along a length thereof.

10. The goggle of claim 1 wherein each said frame member includes a lens-holding portion and a face-sealing portion, said face-sealing portion being of substantially lesser durometer hardness than said lens-holding portion.

11. The goggle of claim 10 wherein said bridge connects the proximal ends of said lens-holding portions and said strap connects the distal ends of said lens-holding portions.

12. One-piece integrally-formed swim goggle comprising the following components formed substantially of silicone:
    (A) two lenses,
    (B) two frame members, each frame member mounting a respective one of said lenses and having a proximal end and a distal end,
    (C) a bridge connecting said proximal ends of said frame members, and
    (D) a strap connecting said distal ends of said frame members;
    said components being flexible, and said goggle being integrally formed in a molding operation;
    said lenses having a durometer hardness higher than said frame members, and said frame members having a durometer hardness higher than said strap;
    said lenses being formed of a transparent colorless material, and the other of said components being formed of a material colored relative to said transparent colorless material;
    said lenses and said frame members being watertight.

13. The goggle of claim 12 wherein said frame members are formed of material including microballoons.

14. The goggle of claim 12 wherein said lenses are formed from a breathable material to promote temperature equalization between both major surfaces of each of said lenses.

15. A method of forming one-piece integrally-formed goggle comprising the steps of:
    (A) preparing a flexible material; and
    (B) integrally forming from the flexible material a goggle having the following components: two lenses, two frame members, a bridge connecting proximal ends of the frame members, and a strap connecting distal ends of the frame members.

16. The method of claim 15 wherein each component is flexible and formed substantially of silicone.

17. The method of claim 15 wherein the lenses have a durometer hardness higher than the frame members, and the frame members have a durometer hardness higher than the strap.

18. The method of claim 15 wherein the lenses are formed of a transparent colorless material, and the other of said components are formed of a material colored relative to said transparent colorless material.

19. The method of claim 18 wherein the colored components are substantially transparent.

20. The method of claim 15 wherein the frame members are made of material including microballoons.

21. The method of claim 15 wherein the lenses are formed from a breathable material to promote temperature equalization between both major surfaces of each lens.

22. The method of claim 15 wherein the components are integrally formed by molding.

23. A method of forming one-piece integrally-formed swim goggle comprising the steps of:
    (A) preparing a flexible material substantially of silicone; and
    (B) integrally forming from the flexible material in a molding operation a goggle having the following components: two lenses, two frame members, a bridge connecting proximal ends of the frame members, and a strap connecting distal ends of the frame members;
    the lenses and the frame members being water-tight;
    the lenses having a durometer hardness higher than the frame members, and the frame members having a durometer hardness higher than the strap; and
    the lenses being formed of a transparent colorless material, and the other components being formed of a material colored relative to the transparent colorless material.

24. The method of claim 23 wherein the frame members are formed of material including microballoons.

25. The method of claim 23 wherein the lenses are formed from a breathable material to promote temperature equalization between both major surfaces of each lens.

* * * * *